Oct. 14, 1958  U. B. BRAY ET AL  2,856,278
MAKING FERTILIZER-GRADE AMMONIUM ACID SULFATE
Filed Nov. 8, 1954
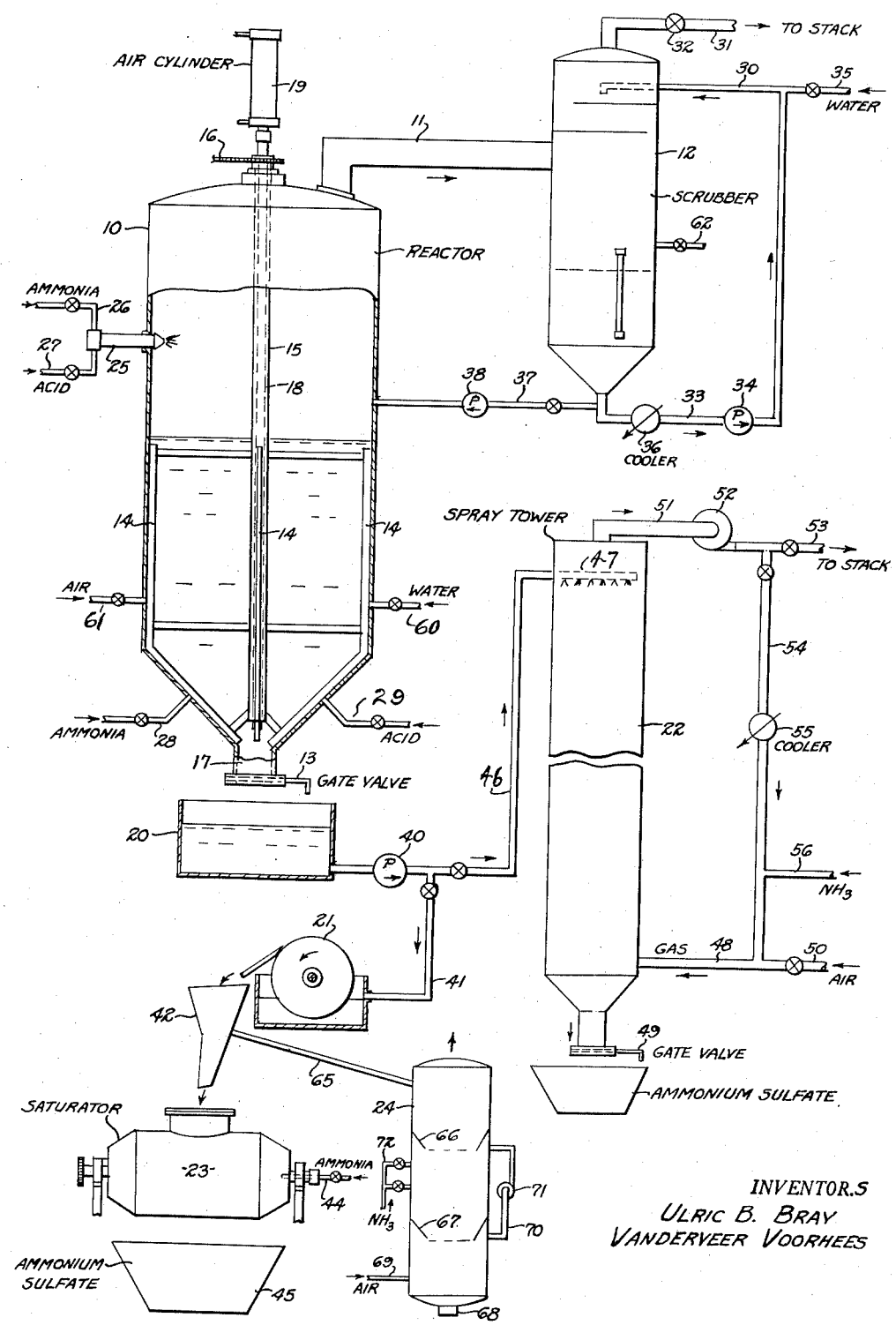
INVENTORS
ULRIC B. BRAY
VANDERVEER VOORHEES

2,856,278
MAKING FERTILIZER-GRADE AMMONIUM ACID SULFATE

Ulric B. Bray, Pasadena, and Vanderveer Voorhees, Los Altos, Calif., assignors to Bray Oil Company, Los Angeles, Calif., a limited partnership of California Application November 8, 1954, Serial No. 467,378

7 Claims. (Cl. 71—25)

This invention relates to a process of manufacturing ammonium acid sulfate and diammonium sulfate from ammonia and sulfuric acid. More particularly, it relates to a process of making fertilizer grade ammonium sulfate from ammonia and waste sulfuric acid from various sources, such as sulfuric acid sludges obtained as by-products in the treatment of petroleum products, low concentration smelter acid and combinations of acids from various sources.

An object of the invention is to produce ammonium sulfate fertilizers in the form of a dry, crystalline material suitable for application to the land or for use in formulating commercial fertilizer mixtures. Another object of the invention is to manufacture ammonium sulfate from ammonia and sulfuric acid in a continuous operation without expensive evaporation of water from the product and without expensive crystallization of the product from water solutions.

Another object of the invention is to produce substantially anhydrous ammonium sulfate in admixture with various material such as carbonaceous compounds resulting from decomposition of sludge acids, without segregation of the impurities from the ammonium sulfate product. Still another object of the invention is to react ammonia and sulfuric acid directly at a temperature sufficient to drive off the water present while retaining all the ammonia in the reaction product, thus making it unnecessary to recover ammonia from the waste gases and vapors from the reaction.

The invention is illustrated by a drawing which shows schematically an apparatus suitable for carrying out the process.

Heretofore it has been the practice in making ammonium sulfate from sulfuric acid to neutralize the acid with ammonia in aqueous solution while cooling to eliminate heat from the neutralization reaction and thereafter evaporating the solution to precipitate crystals of ammonium sulfate which must be removed from the solution and dried. Where the acid employed is contaminated with impurities as in the case of many by-product acids, this method has required extensive purification of the acid before neutralization. Such is the case with sulfuric acid obtained in chemical processes where sulfuric acid is used as a catalyst as in the nitration of aromatic hydrocarbons, the alkylation of hydrocarbons in the manufacture of high octane gasoline, polymerization of gases, refining of lubricating oils, kerosene, gasoline, coal and shale distillates, etc., and in the sulfonation of hydrocarbon oils, alkyl aromatic hydrocarbons, and similar acid treating operations. We have found, however, that for use in the manufacture of fertilizer grade ammonium sulfate, purification is not necessary if crystallization of the ammonium sulfate from aqueous solutions is avoided. It is an object of our process to avoid crystallization of aqueous ammonium sulfate solutions which results in segregation of troublesome impurities.

According to our invention, we effect the conversion of sulfuric acid into ammonium sulfate in two principal stages. In the first stage, we convert the acid into ammonium bisulfate or "acid ammonium sulfate" which we maintain in the form of a fused mass and thereafter we convert the bisulfate into neutral ammonium sulfate by treatment with ammonia gas.

Our process will be readily understood by referring to the drawing in which neutralizing chamber 10 is connected by vapor line 11 to vapor scrubber 12. Chamber 10 is also provided with a gate valve 13 at the bottom to withdraw molten ammonium bisulfate from time to time or continuously. Drum 10 is also provided with a suitable means for agitating the contents as indicated by paddles 14 which are arranged to be rotated or oscillated within the drum by shaft 15, actuated through gearing 16. To prevent plugging of the outlet 17, a central rod 18 is provided within hollow shaft 15, rod 18 being actuated by a piston within air cylinder 19.

Receiving tank or pan 20 is provided to collect the molten bisulfate from drum 10, from which it is supplied either to crystallizer 21 or spray tower 22 or both, simultaneously, if desired. From 21 it can be converted to diammonium sulfate in drum 23 or tower 24.

In the operation of our process, anhydrous ammonia and acid sludge or commercial grade sulfuric acid, for example, 75 to 95% $H_2SO_4$, are injected into mixing nozzle 25, the ammonia being supplied by line 26 and the acid by line 27. The mixing nozzle employed is designed to effect mixing at the tip of the nozzle and exteriorly thereof to avoid plugging the nozzle with solid ammonium sulfate. Such a nozzle is described in our co-pending application Serial No. 356,398, filed May 21, 1953, now Patent No. 2,754,192.

The rate of feeding ammonia and acid are controlled to produce ammonium bisulfate as the principal product. A suitable ratio is approximately 15 to 20 parts of ammonia by weight (anhydrous basis) for each 100 parts of sulfuric acid, 100% $H_2SO_4$ basis. Sufficient excess ammonia may be employed to produce from 10 to 50% of diammonium sulfate in the product but excessive amounts of diammonium sulfate result in solidification of the product. The higher the temperature, the more diammonium sulfate which can be tolerated, but excessive temperatures result in dissociation and decomposition. For most purposes, it is desirable to operate to produce a mixture containing about 20 to 30% diammonium sulfate, the remainder being ammonium bisulfate, carbonaceous matter and other impurities.

When reaction chamber 10 is partially filled with melted ammonium bisulfate, additional ammonia and sulfuric acid can be introduced by lines 28 and 29 respectively, the ammonia being injected as liquid ammonia or ammonia gas beneath the surface of the fused ammonium bisulfate in the reactor. Under these conditions, with proper agitation, the ammonia reacts instantly with the ammonium bisulfate, converting part of it to diammonium sulfate which in turn is reconverted to bisulfate by the addition of acid through line 29. In this manner, the reaction is maintained continuously in reactor 10 and the introduction of ammonia and acid through mixing nozzle 25 can be discontinued. The body of fused sulfate therefore acts as a buffer for the reaction.

It is preferred to maintain a temperature in reactor 10 between about 250° and 400° F., although higher temperatures can be employed, for example, up to 500° F. or higher. However, materials of construction indicate the preferred operation is in the lower temperature range of about 300° to 375° F. Inasmuch as considerable water is usually present in the sulfuric acid employed, this is evolved as steam which is conducted by vapor line 11 to scrubber 12, where it is contacted with sufficient cooling water introduced by line 30 to absorb ammonium compounds usually carried over as dust in the hot gases from reactor 10. The steam and other gases are discharged from scrubber 12 by line 31. Valve 32 can be employed to maintain a back pressure on the system, if desired, thereby reducing the volume of the vapors carried out from reactor 10 and reducing the amount of cooling required in scrubber 12. Thus a pressure on the system of 10 to 50 p. s. i. can be employed with considerable advantage from the standpoint of heat economy, also increasing the fluidity of the molten bisulfate product.

The scrubbing liquid collected in the bottom of scrubber 12 is recycled by line 33 and pump 34, additional water being introduced as needed by line 35. Cooler 36 is provided to reduce the amount of water required to be added to the scrubber and heat obtained from cooler 36 can be usefully employed, for example, in making steam. If desired, a heat exchanger can be employed in vapor line 11 to recover the heat from the hot vapors. As the concentration of ammonium salts in the scrubbing liquid increases, a portion of the scrubbing liquid is withdrawn from time to time or continuously, by line 37 and pump 38, and injected into reactor 10, where it is again evaporated and combined with the contents of the reactor.

We may dispense with the vapor scrubbing system when operating conditions are controlled to make little or no dust. Thus, when feeding all ammonia below the surface of the melted sulfate, little dust is formed by sublimation and dissociation. We can employ baffles or a cyclone separator within reactor 10 at the vapor outlet thereof to knock back solids in the manner well known in the art.

As the molten ammonium bisulfate accumulates in reactor 10, it is withdrawn from time to time or continuously, by valve 13 into receiver 20 whence it is conducted by pump 40 and line 41 to crystallizing or flaking drum 21. Drum 21 is supplied internally with cooling water and the ammonium bisulfate product congeals on the surface of the drum, falling into hopper 42, leading to saturator 23. Saturator 23 can be a large cylinder mounted on trunnions provided with an inlet 44 for the injection of anhydrous ammonia gas, under pressure if desired. Liquid anhydrous ammonia can be introduced into the bisulfate, the refrigerating effect of the liquid serving to hold down the temperature of neutralization. The saturator can be closed after filling with bisulfate and then revolved while ammonia is injected to complete the conversion into diammonium sulfate, which is thereafter discharged into receiver 45. Inasmuch as the reaction between ammonium bisulfate and ammonia gas is very rapid, we can also effect neutralization or saturation of the bisulfate in a vertical tower 24, through which the ammonium bisulfate passes by gravity, as a moving bed, the ammonia gas being introduced at an intermediate point while air may be introduced at the bottom to scavenge any excess ammonia from the product and carry it upward into the mass of ammonium bisulfate which completely absorbs ammonia from the air in the upper part of the tower, the air serving to carry away the heat of the reaction.

An alternative method of saturating the bisulfate product with ammonia is shown in the drawing in the form of spray tower 22. The molten ammonium bisulfate is conducted by line 46 to a distributor or spray 47 which introduces it in the form of small droplets from the top of a tall tower, 22, in the bottom of which a stream of ammonia gas is introduced by line 48. As the finely divided liquid bisulfate comes in contact with the ammonia gas in tower 22, it is converted into diammonium sulfate which is withdrawn at the base of the tower through gate valve 49. To prevent excessive heating and effect solidification of the product in tower 22, air can be introduced by line 50 and exhausted from the top of the tower by line 51 and fan 52, then discarded to the stack by line 53. However, where it is desirable to reclaim a part of the heat of neutralization, this can be done by recycling the gases in tower 22, recycle line 54 being provided for the purpose. The heat exchanger or cooler 55, absorbs the heat from the recycle gases and ammonia is introduced into the tower through feed line 56.

Although we have described transferring the molten ammonium bisulfate to cooling reservoir 20, it should be understood that molten bisulfate product can be passed directly to the neutralizing tower 22 or to the flaking machine 21. In general, there is a tendency for the carbonaceous impurities in the ammonium bisulfate to segregate from the molten salt when allowed to stand and settle, in the case where the acid employed in the process is sludge acid. When manufacturing fertilizers, it is usually desirable to maintain sufficient agitation in the molten ammonium bisulfate to prevent separation of such impurities. However, where it is desired to manufacture ammonium sulfate of a higher degree of purity, the molten bisulfate can be allowed to settle or segregate in 20 and only the clear fused salt drawn off to the crystallizer or saturator. Carbonaceous impurities, coky substances, etc., can be saturated separately for use in fertilizer manufacture or for processing into ammonium sulfate by the usual recrystallization processes in which the sulfate is dissolved in water, filtered from coke and other insoluble matter and recrystallized.

In the operation of our process employing sludge acids, alkylation acid, etc., we have found that when the temperature of the reactor 10 is maintained above about 300° F., the organic impurities are substantially converted into coke, so that the final ammonium sulfate product is substantially free of organic impurities other than suspended carbon. The temperature of reactor 10 can be controlled in various ways, for example, by direct cooling or by injection of water through line 60 or injection of air through line 61. The temperature may also be controlled by introducing water into the acid introduced by line 29. Likewise, aqueous ammonia can be introduced either by line 28 or another feed line not shown, the water in the ammonia serving to cool the mixture by formation of steam. It is preferred to employ a special nozzle on ammonia feed line 28 to prevent plugging with solid diammonium sulfate, a valve of the conventional cleanout type being employed for the purpose.

When operating the process on sludge acid, the sludge will usually have an acidity based on $H_2SO_4$ of the order of 40 to 90%, the remainder being water, hydrocarbons, coke, etc. It is not necessary to purify the sludge in any way but, if desired, it can be separated into thin and heavy fractions by settling, adding water, etc. More volatile hydrocarbons contained in the sludge boiling about 100 to 500° F., are carried out of the reactor 10 to vapor line 11 and mostly condense in scrubber 12, where they collect as an upper layer on the scrubbing water to be drawn off periodically by line 62. When operating at lower temperatures of the order of 250° to 300° F., carbonaceous materials in the sludge, particularly organic acids, sulfonic acids, etc., remain undecomposed to a large extent and pass out of the reactor 10 with the molten ammonium bisulfate. These substances remain distributed in the final ammonium sulfate product, usually in the form of ammonium salts of the various organic acids present, ammonium sulfonates, etc. $SO_2$ contained in the sludge is largely driven off with the steam because ammonium sulfite dissociates largely in the presence of ammonium bisulfate at the temperatures employed.

Referring again to saturator 24, granular or flake ammonium bisulfate is fed to the top of the tower 24 by conveyor 65, passes down in a moving bed over conical baffles 66 and 67, then out at the bottom by discharge opening 68. Air introduced by line 69 flows upwardly, counter current to the downflowing sulfate, and serves to sweep from it any excess ammonia adsorbed thereon. The air is withdrawn beneath baffle 67 and conducted by line 70 and blower 71 to the upper section of the saturating tower, entering beneath baffle 66. Ammonia gas is introduced through lines 72, being absorbed rapidly by the sulfate. When necessary, sufficient air can be forced through the central section of the tower to dissipate the heat of neutralization, preventing a temperature rise above about 150–400° F.

In the manufacture of fertilizers, we can introduce other acids besides sulfuric acid into our reactor 10, generally in amounts less than 50 mol percent based on the total acid including sulfuric acid, introduced to the reactor. Thus, we can introduce phosphoric acid or a slurry of acid phosphates made from the treatment of phosphate rock with sulfuric acid. It is important, however, to avoid introducing an excessive amount of such material which will interfere with the fluidity of the ammonium bisulfate and prevent smooth operation of the reactor 10 and the molten bisulfate discharge system. The amount added will usually be within the range of 10 to 40 mol percent of the $H_2SO_4$.

In the case where nitric acid is introduced into reactor 10 simultaneously with sulfuric acid, it may be added in the form of a spent nitration mixture, such as that obtained from the nitration of cellulose, glycerine, toluene, etc., in the manufacture of explosives. Dilute nitric acid may also be obtained directly from nitrogen fixation processes, such as the electric arc process and the "WARF" process. When employing nitric acid in reactor 10, it is desirable to use sulfuric acid containing substantially no organic matter which would be oxidized by the nitric acid, resulting in the loss of valuable nitrogen. By introducing air or oxygen into reactor 10, however, the loss of nitrogen resulting from reduction of nitric acid by organic matter can be substantially prevented. In fact, the use of a small amount of nitric acid in reactor 10 serves as a catalyst for the oxidation and destruction of organic matter by air, thereby producing a white ammonium bisulfate of high purity and attractive appearance which can be converted into diammonium sulfate of good marketability. The amount of nitric acid required for catalytic purposes will usually be less than 1% of the amount of sulfuric acid charged to reactor 10, for example, 0.1 to 0.5%. However, where the final product is employed as a fertilizer, it is usually desirable to employ larger amounts of nitric acid which becomes ammonium nitrate mixed with ammonium bisulfate and ammonium sulfate. In this case, where the amount of nitric acid employed is as much as 10 to 20% of the sulfuric acid, the final diammonium sulfate product will have a high nitrogen content, usually from about 20 to 30% nitrogen.

Both nitric acid and phosphoric acid can be employed simultaneously with sulfuric acid in our process for making ammonium bisulfate and diammonium sulfate fertilizers. In order to maintain smooth continuous operation of the process, however, it is necessary to control the amount of nitric acid and phosphoric acid added along with the sulfuric acid to prevent formation of a reaction mixture within reactor 10, which cannot be maintained in a satisfactory fluid condition. The ratio of ammonia to sulfuric acid must also be controlled to avoid formation of excessive amounts of diammonium sulfate which will considerably increase the fusion point of the mixture as will be shown by the following data: mixtures of diammonium sulfate and ammonium bisulfate were prepared, containing 20% and 33% respectively of the diammonium sulfate. These were fused at elevated temperatures to a clear melt and allowed to cool, noting the temperature at which crystals formed and also the temperature at which the extent of crystal formation had proceeded to a point where the mixture was a mush which could still be handled as a liquid with suitable agitators, lines, valves and pumping equipment. The results are as follows:

| | | | |
|---|---|---|---|
| Diammonium sulfate, percent | 0 | 20 | 33 |
| Ammonium bisulfate, percent | 100 | 80 | 77 |
| Clear Melt, ° F | 430 | 430 | 600 |
| Crystals appeared, ° F | | 385 | 580 |
| Fluid Mush, ° F | 280 | 370 | 440 |

On account of the advantage of operating the apparatus at moderately low temperatures, it is desirable to employ a ratio of ammonia to acid such that the amount of ammonium bisulfate should be at least about 60% and preferably in the range of 75 to 95%. When operating in such a manner with a highly fluid product in reactor 10, it is not necessary to employ a mechanical agitator owing to the high degree of agitation obtainable by introduction of ammonia gas and acid below the surface of the molten ammonium bisulfate in the reactor. However, where heavy sludges are employed instead of commercial sulfuric acid, particularly sludges containing a high percentage of organic matter, it is important to employ sufficient agitation to present masses of coke separating from the sludge, to plug the discharge outlet from the reactor and to accumulate on the walls and bottom of the reactor chamber 10. For this reason, it is usually desirable to employ a mechanical agitator somewhat similar to that shown in the drawing, in which the agitator maintains coky masses in suspension and prevents their accumulation on the walls of the reactor. Reversing or oscillating the agitator paddle can be employed to increase the violence of the agitation and break up lumps of soft, coky material suspended in the molten body of ammonium bisulfate, thereby crushing and dispersing this material.

As previously indicated, the vapors from reactor 10, consisting largely of steam from the evaporation of water contained in the acid and water introduced as a coolant to the reaction chamber, usually contain substantial amounts of sulfur dioxide in the case where sludge acids are employed in the process. These vapors can sometimes be discharged directly to the atmosphere but where the vapors contain a substantial amount of ammonium sulfate in the form of a dust or fog, it is desirable to recover ammonium salts from the gases by employing a scrubbing system as hereinabove described. Such a scrubbing system is usually subject to the corrosive action of sulfurous acid and should be constructed of acid resistant materials such as stainless steel, lead lined steel, etc. One advantage of our process of making ammonium bisulfate, results from the fact that the bisulfate, being a liquid at the temperature employed in the reactor, is less subject to the formation of fog and dust than in the case where diammonium sulfate is the primary product. Likewise, introduction of ammonia and acid beneath the surface of the molten mass of bisulfate in the reactor results in a smoother reaction with less violence, ebullition, and substantially no vaporization of ammonium salts as is the case where the acid and the ammonia are mixed directly in the vapor space. The mass of melted bisulfate thus serves as a temperature equalizer, absorbing ammonia instantly on the one hand to form suspended and dissolved diammonium sulfate in the mass, while the sulfuric acid, introduced at a remote point, reacts with the diammonium sulfate and converts it back to the easily liquefiable ammonium acid sulfate. By avoiding the formation of ammonium sulfate as a major product of the primary reaction in reactor 10, we also avoid the formation of ammonium salts in the vapor phase as a result of dissociation of the diammonium sulfate from local overheating, and at the same time, we find we are required to supply much less cooling in the reactor owing to the lower heat of formation of the mono ammonium sulfate (ammonium bisulfate) in comparison with the heat of formation of diammonium sulfate.

Reactor 10 may be of the rotary drum or kiln type if desired, wherein the contents are kept agitated by the rotation of the drum. In that case, ammonia can be introduced below the surface of the fused ammonium sulfate in the drum, the drum being supported on trunnions in a horizontal or inclined position as is customary with equipment of this type. When employing a moving, self-agitated reactor of this type, we may start the process by charging the drum with ammonium bisulfate and initially melt the charge by applying heat to the outside of the drum or by introducing a torch or by other method. When sufficient volume of melted ammonium bisulfate is accumulated in the reactor, further heat is obtained by the heat of reaction of ammonia and sulfuric acid which are then introduced in the desired proportions to make ammonium bisulfate.

Where excess heat is available as is the case where relatively concentrated acid is employed, for example, 75 to 90% $H_2SO_4$, we may introduce ammonia either in the form of liquid anhydrous ammonia or as aqueous ammonia or so-called "Aqua" containing about 28 to 30% $NH_3$ in water. Water added with the ammonia serves to cool the reaction mixture, the heat being conducted away in the form of steam. In general, it is more convenient to employ either liquid or gaseous anhydrous ammonia and supply additional cooling by supplying water directly to the reaction mixture as needed. Where the acid charge is more dilute, we prefer to charge gaseous anhydrous ammonia preheated to a temperature, for example, 150° to 500° F. or more, sufficient to maintain the bisulfate product in the fluid state. The acid can also be charged in heated condition, usually below the boiling temperature, for example 100 to 250° F.

The ammonium bisulfate product from the initial reaction stage, substantially water free, is non-corrosive and can be handled in ordinary iron equipment. Inasmuch as it is hygroscopic, it is desirable to keep it away from moist air or convert it immediately into diammonium sulfate. In the conversion to diammonium sulfate, we may introduce excess ammonia which is adsorbed by the diammonium sulfate crystals, then subsequently mix the product with an additional amount of ammonium bisulfate sufficient to neutralize the excess absorbed ammonia. In this way, accurate control of the ammonium sulfate can be obtained without loss of valuable ammonia gas. In general, it is desirable to produce a product which contains a small amount of the mono ammonium sulfate, e. g. 1 to 5% to prevent dissociation and loss of ammonia. According to our process, a product of this nature can be made very easily by stopping short of complete saturation of ammonium bisulfate produced in the first stage.

As an example of our process, the following run on a pilot plant scale will be described: a stream of thin sludge acid was sprayed into the upper part of a steel reaction tower, simultaneously with a blast of ammonia gas, mixing taking place at the nozzle. The acid sludge, analyzing about 85% $H_2SO_4$, was derived from the sulfonation of lubricating oil with fuming sulfuric acid and contained carbonaceous material, aromatic solvent, etc., in solution, the bulk of the carbonaceous material, or so-called green acids, having been previously separated and removed as a thick black sludge, sometimes called "liver." The ammonia was employed at cylinder pressure, approximately 160 p. s. i., the liquid ammonia being vaporized in a heater before injecting into the spray nozzle, which was of the atomizing type. The liquid sludge acid was ejected from a central orifice surrounded by a narrow annulus through which the ammonia gas escaped at high velocity, the gas serving to atomize and neutralize the acid instantly with the development of considerable heat. A vent line at the top of the tower carried away the steam and other gases. Water was added when needed for cooling.

The following table is a run card on the operation:

| Time from Start, Minutes | Temp. at Drum Wall, ° F. | Pressure within Drum, p.s.i. | Notations |
|---|---|---|---|
| 000 | 80 | | Sludge and ammonia turned on. |
| 2 | 280 | 10 | Vent gas, neutral odor. |
| 5 | 320 | 11 | Do. |
| 7 | 340 | 8 | $SO_2$ in vent gas. |
| 10 | 355 | 10 | Trace of $SO_2$. |
| 12 | 375 | 11 | Trace of $SO_2$. Cooling water started in drum. |
| 14 | 385 | 12 | Neutral odor in vent gas. |
| 15 | 370 | 14 | Do. |
| 17 | 365 | 12 | Odor of ammonia in vent gas. |
| 20 | 355 | 11 to 15 | Do. |
| 30 | 240 | | New cylinder of ammonia connected. Cooling water off. Ammonia odor. |
| 35 | 300 | | |
| 36 | 325 | 10 | $SO_2$ in vent gas (odor). Drain valve heated with torch. |
| 38 | 360 | | Vent gas neutral. 2 gals. molten sulfate drawn off. |
| 40 | 375 | | Cooling water in. |
| 44 | 360 | 20 to 12 | Slight ammonia odor in vent gas. Difficulty with acid feed control. |
| 50 | 345 | | Ammonia in vent gas. |
| 60 | 365 | 10 | $SO_2$ in vent gas. Acid line blown clean. |
| 61 | | | Ammonia in vent gas. More molten sulfate withdrawn. |
| 63 | 345 | | $SO_2$ in vent gas. |
| 65 | | | Run discontinued. |

About 9 gallons of molten acid sulfate was drawn off having a temperature of 256° F. It was allowed to freeze in a mass and was found to weigh 119 lbs. After cooling, the reaction chamber was cleaned out and was found to contain 202.5 lbs. additional sulfate mixed with dark, coky material. The following analyses were made—

Percent

Material, white, solid, crystalline acid sulfate.
Acidity, positive (methyl red).
Ammonia, Kjeldahl method _____ 13.6
Ammonium bisulfate by titration (methyl red indicator) _____ 80.5
Ammonia, titration with excess standard KOH and back titration _____ 13.6

In the above described operation, no special agitation was provided in the reaction chamber and all the charge was introduced through the mixing spray nozzle above described. As a result, there was a considerable segregation in the reaction chamber and when it was cleaned out, the material found remaining in the chamber was a coarse, lumpy mass mixed with powdery ammonium sulfate, coke, etc. A representative sample was ground into a fine powder and was analyzed by titration as above, titrating one sample with methyl red indicator, cold, and another sample after boiling off the ammonia. The results on one gram samples, were 9 cc. and 68 cc KOH, 0.1788 normal. From these results, it is calculated that the material contains 18.5% mono ammonium sulfate and 58.6% diammonium sulfate. A portion of this product was extracted with water to remove the ammonium sulfate, leaving a black, powdery material, which was filtered off, proving to be largely carbon.

*Saturation of ammonium bisulfate*

A quantity of the white crystalline ammonium bisulfate was remelted at 400° F. and granulated by pouring gradually into cold, light naphtha. The naphtha was evaporated by exposing to the air overnight. The granulated bisulfate was then placed in a pressure vessel and subjected to the action of ammonia gas under pressure of about 150 p. s. i. for a prolonged period. On releasing the pressure from the cylinder, considerable refrigeration occurred owing to the evaporation of excess adsorbed ammonia from the ammonium sulfate. Samples of the sulfate, both before and after saturation with ammonia, were analyzed by titration as above described with the following results:

|  | Before Saturation | After Saturation |
|---|---|---|
|  | Percent | Percent |
| $NH_4HSO_4$ | 75.2 | 0 |
| $(NH_4)_2SO_4$ | 18.2 | 94.5 |
| Total sulfate | 93.4 | 94.5 |

These results show complete conversion of the ammonium bisulfate in the solid state to diammonium sulfate by the action of dry ammonia gas producing a substantially anhydrous ammonium sulfate product suitable for use as a nitrogenous fertilizer without the necessity for crystallization, drying, or other expensive treatment. If desired to obtain the product in a particular crystalline form, however, it can be readily accomplished by solution and crystallization as described in our co-pending application Ser. No. 356,398, filed May 21, 1953.

If desired to obtain a product in the form of pellets or granules, this can be readily effected by tempering the powder with a small amount of water and forming into a cake or directly into pellets, for example, about 1/16" to 1/8" diameter by means of corrugated or dimpled rolls through which the product is passed and subjected to high pressures. If it is desired, a small amount of a lubricant, for example, about 0.1% wax or stearic acid can be added to facilitate the pelletizing operation, while compressed cakes or masses of the product can be crushed and graded to any desired size.

Another lot of ammonium bisulfate from the pilot plant operation hereinabove described, was remelted at 350° F. and solidified to a cake, which was broken up into small lumps of about 1/2" thickness. These were charged to a pressure vessel and exposed to ammonia gas at a pressure of about 150 p. s. i. The neutralization reaction was rapid, heat being evolved from the pressure vessel for about 3 hours. Ammonia pressure was maintained for about 16 hours, then released and excess ammonia evaporated from the powdery product in a current of air. Some of the lumps still retained their original shape but had changed from a white crystalline appearance to a chalky white appearance. On analysis, one of the lumps was dissolved in distilled water and tested neutral to methyl red, indicating no ammonium bisulfate present. Titration with excess standard potassium hydroxide, boiling off the ammonia and back-titrating with standard hydrochloric acid, indicated the product consisted of 93% diammonium sulfate. The remainder appeared to be moisture and impurities derived from the sludge, probably iron, calcium and sodium sulfates.

The term "ammonium sulfate" is employed herein to mean either bisulfate or diammonium sulfate or a mixture when the composition is not known. Although we have described our process with respect to specific examples thereof, we do not intend that it be limited to these examples but by the scope of the following claims.

We claim:

1. The process of making ammonium salts of sulfuric acid which comprises introducing ammonia and sulfuric acid into a fused body of ammonium acid sulfate, maintaining the mol-ratio of ammonia to sulfuric acid between 1 and 1.5 mols of $NH_3$ to 1 mol of $H_2SO_4$, maintaining the temperature of the said fused body above about 300° F., the point of solidification of ammonium acid sulfate by the exothermic heat of reaction and simultaneously evaporating substantially all water present and withdrawing fused ammonium acid sulfate from the said body without interrupting the introduction of ammonia and acid thereto.

2. The process of claim 1 wherein the said sulfuric acid is a sludge acid containing organic substances which are largely decomposed into coke in said fused body of ammonium acid sulfate.

3. The process of claim 2 wherein said coke is separated from said fused ammonium acid sulfate and the resulting coke-free liquid ammonium acid sulfate is converted into diammonium sulfate by contacting with anhydrous ammonia.

4. The process of claim 2 wherein said coke is dispersed throughout said fused ammonium acid sulfate and the mixture is converted into diammonium sulfate suitable for agricultural fertilizer by contacting with ammonia.

5. The process of claim 1 wherein there is charged to said fused body of ammonium acid sulfate an acid selected from the class consisting of nitric and phosphoric acids in minor amount on a molar basis with respect to said sulfuric acid.

6. The process of making substantialy pure diammonium sulfate from ammonia and sulfuric acid sludge containing organic matter which comprises charging ammonia and said sulfuric acid sludge into a body of fused ammonium bisulfate, maintaining the temperature of said body above 300° F., agitating said fused bisulfate to effect thorough mixing therein, evaporating substantially all water present in said sludge by the heat of the reaction, simultaneously introducing a current of an oxygen containing gas into said fused bisulfate to effect oxidation of said organic matter and thereafter converting the resulting ammonium bisulfate to diammonium sulfate by contacting with ammonia.

7. The process of claim 6 wherein nitric acid is charged to said fused bisulfate to catalyze the said oxidation reaction.

References Cited in the file of this patent

UNITED STATES PATENTS

| 1,923,212 | Jost et al. | Aug. 22, 1933 |
| 1,962,185 | Fauser | June 12, 1934 |
| 1,973,892 | Denig | Sept. 18, 1934 |
| 2,331,235 | Ruys et al. | Oct. 5, 1943 |
| 2,482,643 | Tiddy | Sept. 20, 1949 |
| 2,600,253 | Lutz | June 10, 1952 |
| 2,700,004 | Miller | Jan. 18, 1955 |